United States Patent
Miyabe (10) Patent No.: US 12,208,869 B2
(45) Date of Patent: Jan. 28, 2025

(54) DISTURBANCE ESTIMATING APPARATUS, METHOD, AND COMPUTER PROGRAM

(71) Applicant: Furuno Electric Co., Ltd., Hyogo (JP)

(72) Inventor: Yuta Miyabe, Nishinomiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 379 days.

(21) Appl. No.: 17/841,236

(22) Filed: Jun. 15, 2022

(65) Prior Publication Data

US 2023/0406463 A1 Dec. 21, 2023

(51) Int. Cl.
*B63B 79/15* (2020.01)
*B63B 49/00* (2006.01)
*B63H 25/04* (2006.01)

(52) U.S. Cl.
CPC .............. *B63B 79/15* (2020.01); *B63B 49/00* (2013.01); *B63H 25/04* (2013.01); *B63H 2025/045* (2013.01)

(58) Field of Classification Search
CPC ......... B63B 79/15; B63B 49/00; B63H 25/04; B63H 2025/045; G05D 1/0206
USPC .......................................................... 340/939
See application file for complete search history.

(56) References Cited

U.S. PATENT DOCUMENTS

| | | | | |
|---|---|---|---|---|
| 7,305,928 | B2* | 12/2007 | Bradley | B63H 25/42 114/144 R |
| 8,924,054 | B1* | 12/2014 | Arbuckle | G05D 1/0206 701/518 |
| 10,829,191 | B2* | 11/2020 | Wong | G05D 1/0208 |
| 11,059,558 | B2 | 7/2021 | Wong et al. | |
| 2016/0229500 | A1* | 8/2016 | Ando | G06F 3/14 |
| 2017/0233051 | A1 | 8/2017 | Kawasaki et al. | |

FOREIGN PATENT DOCUMENTS

| | | |
|---|---|---|
| JP | H08324493 A | 12/1996 |
| JP | 2021041872 A | 3/2021 |
| WO | 2015129337 A1 | 9/2015 |
| WO | 2016017358 A1 | 2/2016 |

OTHER PUBLICATIONS

European Patent Office, Extended European Search Report Issued in Application No. 23179314.2, Nov. 17, 2023, Germany, 8 pages.

* cited by examiner

*Primary Examiner* — Eric Blount
(74) *Attorney, Agent, or Firm* — Alleman Hall & Tuttle LLP (57) ABSTRACT

A disturbance estimation apparatus including a navigation data receiver, a thrust data receiver, and processing circuitry is provided. The navigation data receiver acquires navigation data including an actual position and time of the ship on a water surface. The thrust data receiver receives thrust data indicating a magnitude and a direction of a thrust force of the ship. The processing circuitry estimates a predicted position of the ship at a future point in time and a predicted arrival time of the ship to reach the predicted position by inputting the navigation data and the thrust data into a first trained model, and determines disturbance data including a drift direction and drift speed of the ship drifted by an external force based on a difference between the predicted position estimated by the first trained model and the actual position of the ship at the predicted arrival time.

13 Claims, 11 Drawing Sheets

DISTURBANCE ESTIMATING APPARATUS, METHOD, AND COMPUTER PROGRAM

BACKGROUND

Technical Field

The present disclosure mainly relates to a method and an apparatus for estimating disturbance and positioning a marine vessel, and more specifically, to a method and an apparatus for automatically maintaining a selected position or heading direction of a marine vessel.

Description of the Related Art

In an automatic maneuvering (auto-pilot) of a ship or a fixed position holding of a ship, the required information, such as position information and speed information, is acquired by determining a position of the ship using a GNSS (Global Navigation Satellite System) device on the ship. Based on the position information and the speed information, the hull of the ship is controlled toward the desired course and the fixed position. However, disturbance usually acts on the ship, which can interfere with stable control. Here, "disturbance" is defined as interference (force) that various equipment receives from outside with respect to its normal operating state. Ships are no exception, and wave forces or air forces caused by ocean waves or wind, and irregularities in the sea surface may be the main reason of the disturbances.

Normally, an amount of ship movement acquired during maneuvering includes "an amount of ship movement due to thrust generated by the ship", and "an amount of ship movement due to disturbance". It is difficult to accurately estimate the disturbance from the position information of the ship, because it is difficult to distinguish them based on the position information of the ship. Moreover, this disturbance usually changes by increments. If it is possible to ascertain in a timely manner how much disturbance affects the control of the ship, the hull control can be performed more appropriately. As a result, it is expected that the destination can be reached faster and more accurately.

For the aforementioned reasons, there is a need for providing a method and an apparatus for estimating disturbance acting on the ship in a timely and accurate manner to navigate the ship to the destination faster or holding the ship at a fixed position.

SUMMARY

In an embodiment of the present disclosure, there is provided a disturbance estimation apparatus. The disturbance estimation apparatus includes a navigation data receiver, a thrust data receiver, and processing circuitry. The navigation data receiver configured to acquire navigation data including actual position and time of a ship on a water surface. The thrust data receiver configured to receive thrust data indicating a magnitude and a direction of a thrust force of the ship. The processing circuitry configured to estimate a predicted position of the ship at a future point in time and a predicted arrival time of the ship to reach the predicted position by inputting the navigation data and the thrust data into a first trained model which outputs the predicted position at the future point in time and the predicted arrival time of the ship, and determine disturbance data including a drift direction of the ship drifted by an external force based on a difference between the predicted position estimated by the first trained model and the actual position of the ship at the predicted arrival time.

Additionally, or optionally, the disturbance data further includes a drift speed of the ship drifted by the external force. The processing circuitry further configured to determine the drift speed, based on dividing a distance between the predicted position and the actual position by a time required to reach to the actual position.

In another aspect of the present disclosure, there is provided a disturbance estimation method for estimating disturbance acting on a ship. The disturbance estimation apparatus including acquiring navigation data including actual position and time of the ship on a water surface, receiving thrust data indicating a magnitude and a direction of a thrust force of the ship, estimating a predicted position of the ship at a future point in time and a predicted arrival time of the ship to reach the predicted position by inputting the navigation data and the thrust data into a first trained model which outputs the predicted position at the future point in time and the predicted arrival time of the ship, and determining disturbance data including a drift direction of the ship drifted by an external force based on a difference between the predicted position estimated by the first trained model and the actual position of the ship at the predicted arrival time.

In yet another aspect of the present disclosure, there is provided a non-transitory computer readable medium having stored thereon computer-executable instructions which, when executed by a computer, cause the computer to acquire navigation data including an actual position and time of the ship on a water surface, receive thrust data indicating a magnitude and a direction of a thrust force of the ship, estimate a predicted position of the ship at a future point in time and a predicted arrival time of the ship to reach the predicted position by inputting the navigation data and the thrust data into a first trained model which outputs the predicted position at the future point in time and the predicted arrival time of the ship, and determine disturbance data including a drift direction of the ship drifted by an external force based on a difference between the predicted position estimated by the first trained model and the actual position of the ship at the predicted arrival time.

The disturbance estimation apparatus of the present disclosure enables the ship to accurately grasp the disturbances, as a result the ship will be able to be controlled ahead of time when the ship changes direction. As well as improving the performance of holding a ship at a fixed position is enabled by accurately grasping disturbances, leading to improvement of straight running and turning performance. For example, when turning, the trim rudder angle for resisting the disturbances is reset. As the disturbance is grasped ahead of turning, the required trim rudder angle can relatively easily be predicted. The disturbance data is displayed on a display to indicate the disturbances accurately. In addition to the advantages of manual operation, especially for those who are fishing, how fast the current ship is drifting in which direction is valuable for obtaining a movement of fish. The disturbance data is one of important information that assists the user in navigation of ship or holding the ship at fixed position or while fishing.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION OF THE EMBODIMENTS

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 1:
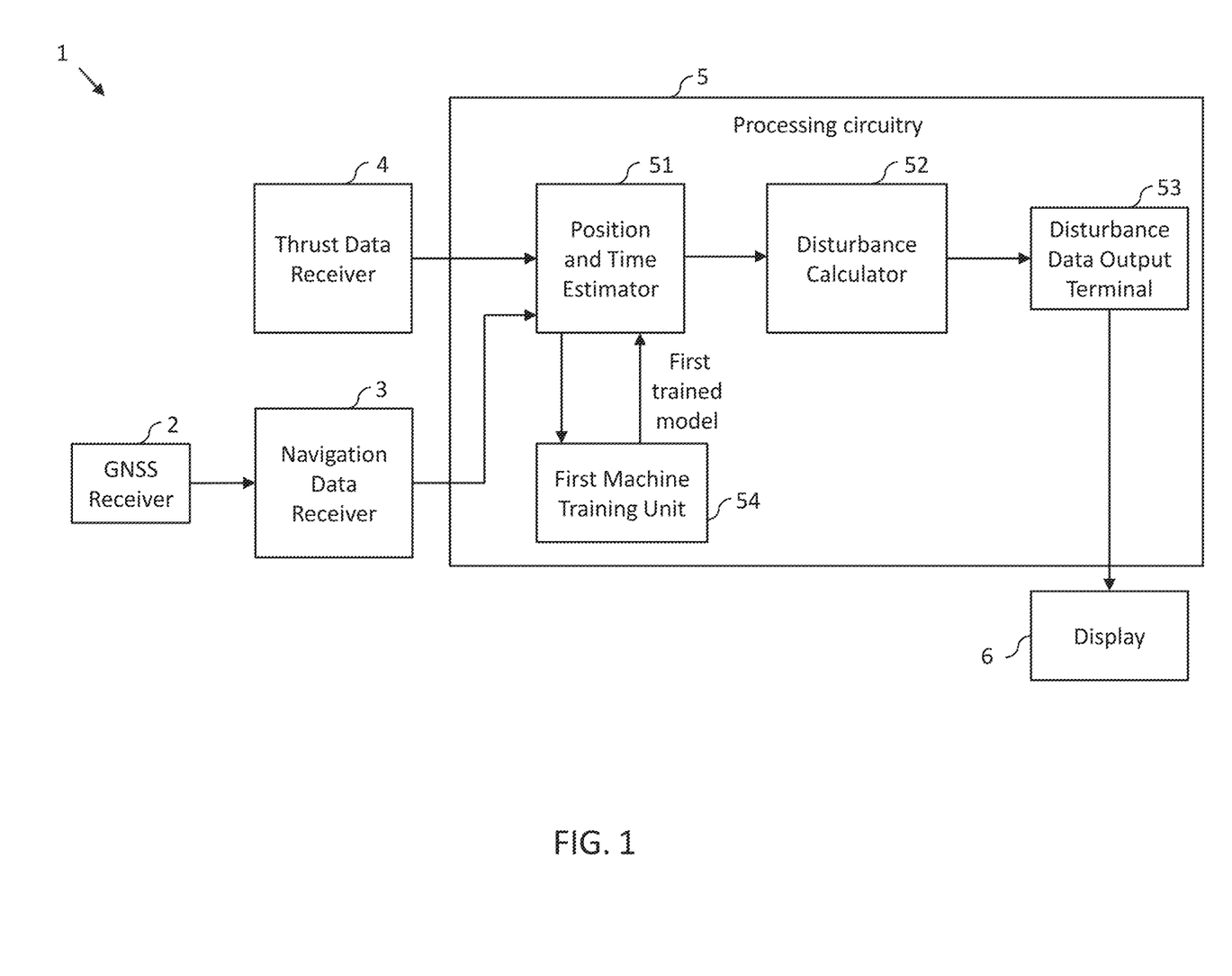
FIG. 1 is a block diagram illustrating a configuration of a disturbance estimation apparatus according to an embodiment of the present disclosure.
Figure 2:
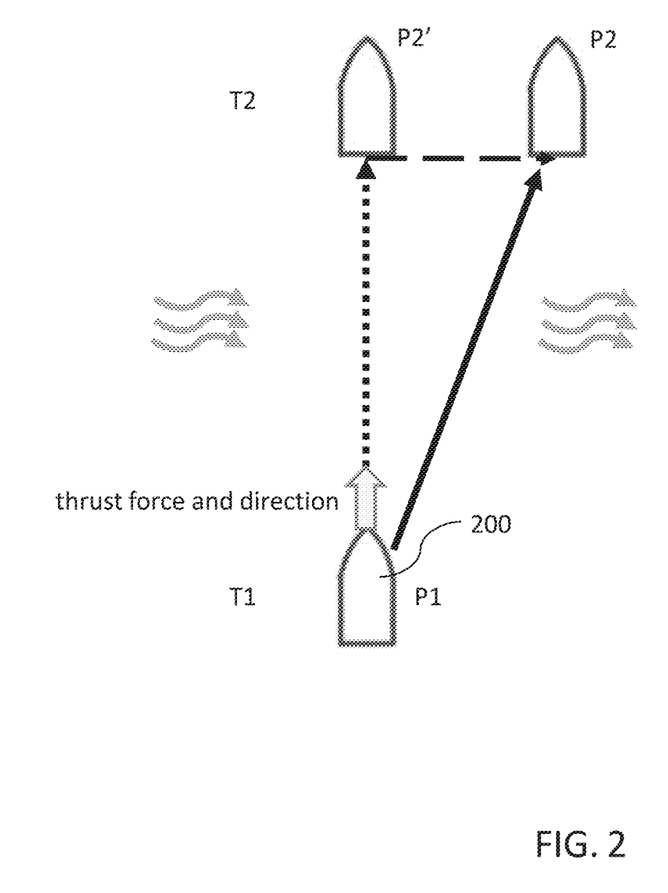
FIG. 2 illustrates an exemplary scenario for determination of the disturbance data according to an embodiment of the present disclosure.

FIG. 1 is a block diagram illustrating a configuration of a disturbance estimation apparatus 1 for estimating disturbance acting on a ship 200, according to an embodiment of the present disclosure. FIG. 2 illustrates an exemplary scenario for determination of the disturbance data according to an embodiment of the present disclosure.

The disturbance estimation apparatus 1 may be installed on the ship 200 for estimating disturbance acting on the ship 200 while navigation of the ship 200 from a source location to a destination location and while maintaining a fixed position of the ship 200. The disturbance acting on the ship 200 must be continuously monitored. The disturbance estimation apparatus 1 is configured to be used for automatically maintaining the selected position or heading direction of the ship 200 by estimating the disturbance acting on the ship 200 due to tidal currents, wind currents, and the like. Automatic maneuvering (auto-pilot) of the ship 200, controls movement of the ship 200, such as navigation or maintaining the fixed position the ship 200, with assistance of the disturbance estimation apparatus 1.

The disturbance estimation apparatus 1 includes a global navigation satellite system (GNSS) receiver 2, a navigation data receiver 3, a thrust data receiver 4, processing circuitry 5, and a display 6.

The GNSS receiver 2 obtains a plurality of signals from a global navigation network system and determines a position of the ship 200 based on the plurality of signals (hereinafter also referred to as "GNSS signal") to generate the actual position of the ship 200. The GNSS receiver 2 provides the actual position of the ship 200 to the navigation data receiver 3. The determination of the position of the ship 200 based on the GNSS signal may performed periodically or continuously, and a moving direction and a moving speed of the ship 200 may be determined along with the actual position of the ship 200. In one embodiment, the moving direction and the moving speed may be determined by a device other than the GNSS receiver 2, such as a ship speedometer. Along with the actual position, the time at which the actual position is generated is acquired and provided to the navigation data receiver 3.

The navigation data receiver 3 acquires navigation data including the actual position P1 indicating the position of the ship 200 at time T1 on a water surface and the actual position P2 indicating position of the ship 200 at time T2 (i.e., predicted arrival time T2). In one embodiment, the navigation data receiver 3 receives the actual position P1 or P2 from the GNSS receiver 2. The thrust data receiver 4 receives thrust data indicating a magnitude and a direction of a thrust force driving the ship 200 during navigation. The processing circuitry 5 estimates a predicted position P2' of the ship at a future point in time and a predicted arrival time T2 of the ship 200 to reach the predicted position P2' by inputting the navigation data and the thrust data into a first trained model which outputs the predicted position P2' of the ship 200 at the future point in time and the predicted arrival time T2. The processing circuitry 5 determines disturbance data including a drift direction of the ship 200 drifted by an external force based on a difference between the predicted position P2' estimated by the first trained model and the actual position P2 of the ship 200 at the predicted arrival time T2. The disturbance data indicates disturbance acting on the ship 200 and assists to control movement of the ship 200 for accurate navigation or holding the ship 200 at a fixed position. The processing circuitry 5 outputs the disturbance data.

With continued reference to FIG. 1, the processing circuitry 5 includes a position and time estimator 51, a disturbance calculator 52, a disturbance data output terminal 53, and a first machine training unit 54. Referring now to FIGS. 1 and 2, an operative state of the ship 200 is evaluated, based on the thrust data acquired by a sensor (shown later) mounted on the motor (engine) or a hull of the ship 200.

It will be understood by a person skilled in the art that although "motor" is referred to in the current embodiment of the present disclosure, alternatively "engine of an internal combustion" may be used in addition to an electric motor, without deviating from the scope of the present disclosure.

In one embodiment, the disturbance calculator 52 further determines a drift speed of the ship 200. The disturbance data further includes the drift speed of the ship 200 drifted by the external force. The disturbance calculator 52 determines the drift speed, based on dividing a distance between the predicted position P2' and the actual position P2 by a time required to reach to the actual position P2 (In FIG. 2, the time from T1 to T2). In one embodiment, the disturbance calculator 52 determines the disturbance data when the magnitude and the direction of the thrust force of the ship 200 are at the substantially constant for a predetermined time, i.e., the magnitude and direction of the thrust force are within predetermined ranges during a specific time interval. In another embodiment, the disturbance calculator 52 determines the disturbance data when a direction and a speed of the ship 200 are at the substantially constant for a predetermined time, i.e., the direction and the speed of the ship 200 are within predetermined ranges during a specific time interval.

Referring now to FIGS. 1 and 2, in one scenario, from time T1 to T2, the ship 200 should arrive at P2', but due to the disturbance, the ship 200 arrives at P2. A vector from P2 to P2' can be interpreted as a direction and a magnitude of the disturbance. If the trained model can estimate the arrival point P2' at T2 assuming no disturbance, the disturbance can be calculated from the difference between the estimated arrival point P2' and the actual arrival point P2 at that time T2. The time T2 is arbitrary and examples of time T2 include, but are not limited to, after 1 second, after 1 minute, and after 10 minutes.

Referring now to FIGS. 1 and 2, the disturbance data output terminal 53 may be operably coupled with, and hence in communication with the disturbance calculator 52 and the display 6. The disturbance data output terminal 53 outputs the disturbance data for displaying the disturbance data on the display 6 that assists in controlling the navigation and/or movement of the ship 200.

Figure 3:
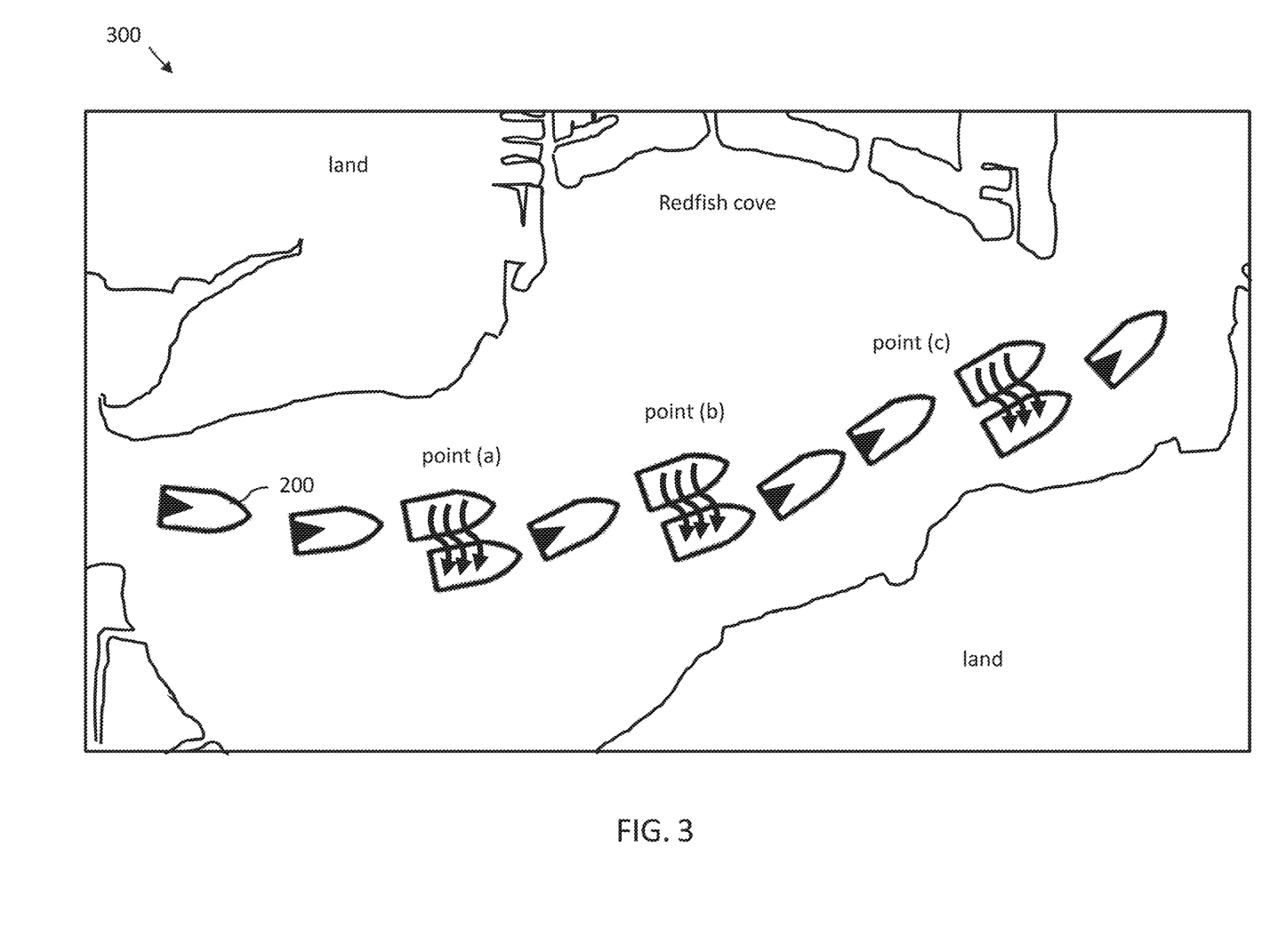
FIG. 3 illustrates a chart including a region surrounding the ship and the disturbance data according to an embodiment of the present disclosure.

FIG. 3 illustrates a chart 300 including a region surrounding the ship 200 and the disturbance data according to an embodiment of the present disclosure. The display 6 may be located on-board the ship 200 and provided with, or in electrical connection to, the processing circuitry 5 on the ship 200, as the ship instrument for purposes as will be explained in detail later herein. The display 6 displays the chart 300 including a region (for example, Redfish cove) where the ship 200 navigates. In addition, in one embodiment, the display 6 displays the disturbance data including the drift direction at a display position on the chart 300. In another embodiment, the display 6 displays the disturbance data including the drift direction and the drift speed at a display position on the chart 300. The display position corresponds to a location at which the disturbance data is determined. The disturbance data is stored in a database (not shown) of the disturbance estimating apparatus 1 as time series data as "drift direction" (direction information of ship movement) and "drift speed" (speed information of ship movement). The information is stored in association with the time and position information of each disturbance estimation process. The display 6 may be a multifunctional display that may be used to store to the database the above information.

The display 6 may be configured as, for example, a display screen that forms part of a navigation assisting device to which a ship operator, i.e., a user, who operates the ship 200 refers. However, the display 6 is not limited to the above configuration, and, for example, it may be a display screen for a portable computer which is carried by a ship operator's assistant who monitors the surrounding situation from the ship 200, a display screen for a passenger to watch in the cabin of the ship 200, or a display part for a head mounted display, such as a wearable glass, worn by a passenger.

Figure 4:
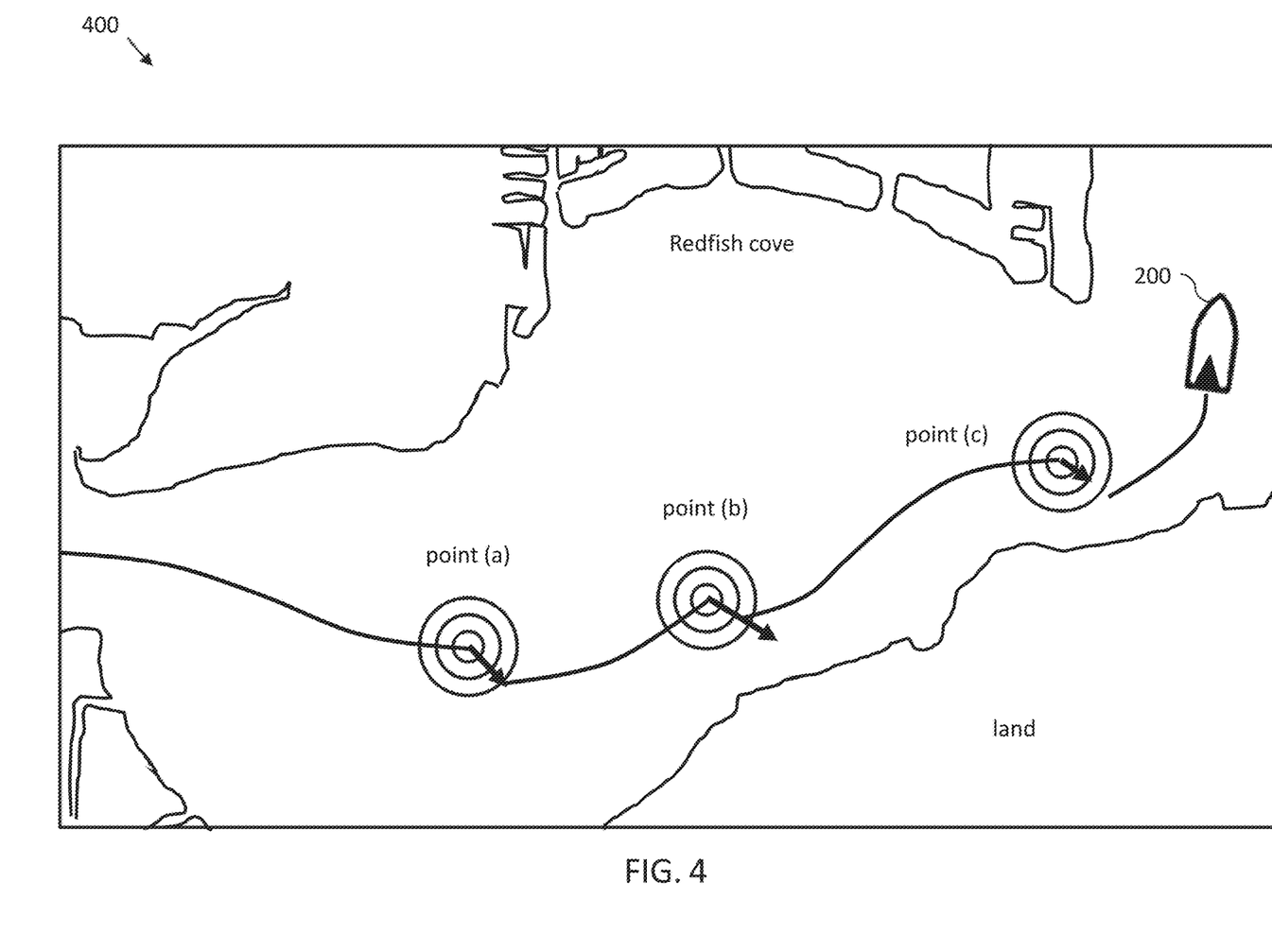
FIG. 4 illustrates a chart including a region surrounding the ship and the disturbance data according to an embodiment of the present disclosure.

FIG. 4 illustrates a chart 400 including a region surrounding the ship 200 and the disturbance data according to an embodiment of the present disclosure. The display 6 may be located on-board the ship 200 and provided with, or in electrical connection to, the processing circuitry 5 on the ship 200, as the ship instrument for purposes as will be explained in detail later herein. The display 6 displays the chart 400 including a region (for example, Redfish cove) where the ship 200 navigates. In addition, the display 6 displays the disturbance data including the drift direction and the drift speed at a display position on the chart 400. The display position corresponds to a location at which the disturbance data is determined. The disturbance data is stored in a database (not shown) of the disturbance estimating apparatus 1 as time series data as "drift direction" (direction information of ship movement) and "drift speed" (speed information of ship movement). The information is stored in association with the time and position information of each disturbance estimation process. The display 6 may be a multifunctional display that may be used to store to the database the above information.

FIG. 4 shows the ship 200 cruising west to east (from left to right) in Redfish Cove, Florida. The drift direction is indicated by arrows on the screen. In this embodiment, the drift speed is also calculated, and its magnitude is known by the length of the arrow.

It will be apparent to a person skilled in the art that although in the current embodiment, the drift direction and drift speed are displayed using arrows, the scope of the present disclosure is not limited to it. In various other embodiments, the drift direction and drift speed may be displayed in any suitable manner, for example, the inside of the circle may be displayed in a gray scale together with the drift direction and drift speed, or the state of the wave may be displayed in a moving image, without deviating from the scope of the present disclosure.

Figure 5:
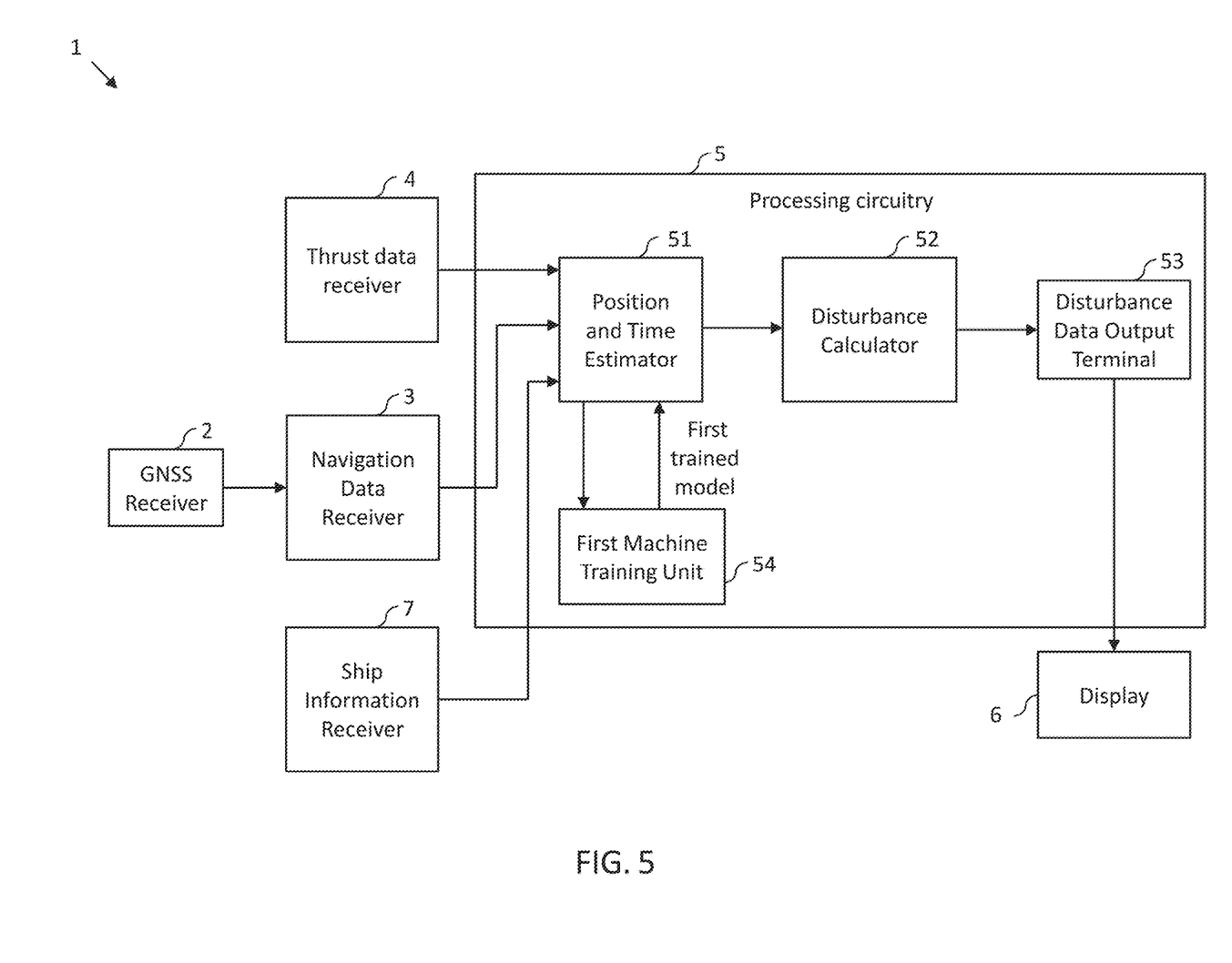
FIG. 5 is a block diagram illustrating a configuration of the disturbance estimation apparatus according to another embodiment of the present disclosure.

FIG. 5 is a block diagram illustrating a configuration of the disturbance estimation apparatus 1 for estimating the disturbance acting on the ship 200, according to another embodiment of the present disclosure.

The disturbance estimation apparatus 1 further includes a ship information receiver 7 that acquires ship information including a size, a weight, a draft, or a shape of the ship 200. The position and time estimator 51 inputs the ship information into the first trained model such that the first trained model outputs the predicted position P2' and the predicted arrival time T2 according to the ship information. The disturbance data further includes the drift speed of the ship 200. The drift speed varies depending on a size and a shape of the ship 200, even if the disturbance factors such as tidal currents and wind currents are the same. Here, the speed of the ship 200 which is acted by the disturbance is defined as the speed with which the ship 200 is moved by the disturbance, that is "drift speed of disturbance." When the magnitude and direction of the thrust force is at substantially constant for the predetermined time, the estimation processing of the disturbance data is started. Thus, the disturbance calculator 52 determines the drift direction and the drift speed of the ship 200.

Figure 6:
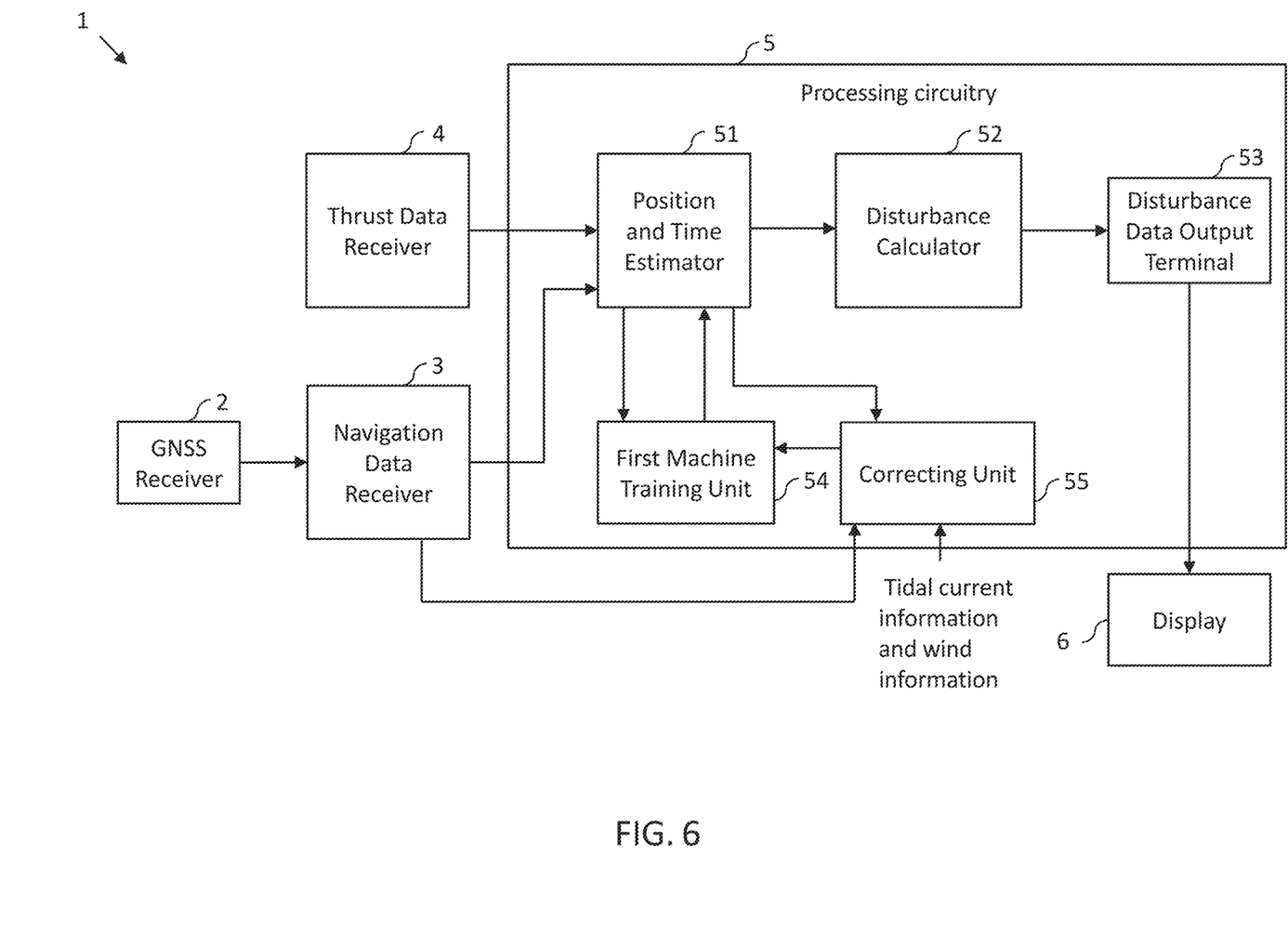
FIG. 6 is a block diagram illustrating a configuration of the disturbance estimation apparatus according to yet another embodiment of the present disclosure.

FIG. 6 is a block diagram illustrating a configuration of the disturbance estimation apparatus 1 for estimating the disturbance acting on the ship 200, according to yet another embodiment of the present disclosure.

The processing circuitry 5 further includes a correcting unit 55 that acquires measurement information measured by a tidal current meter and an anemometer. The measurement information includes tidal current information measured by the tidal current meter and wind information measured by the anemometer. The correcting unit 55 determines presence or absence of the disturbance based on the measurement information and retrains the first trained model using corrected data as training data to output a corrected predicted position based on the actual position P2 arrived at the predicted time T2 when the absence of the disturbance is determined.

Figure 7:
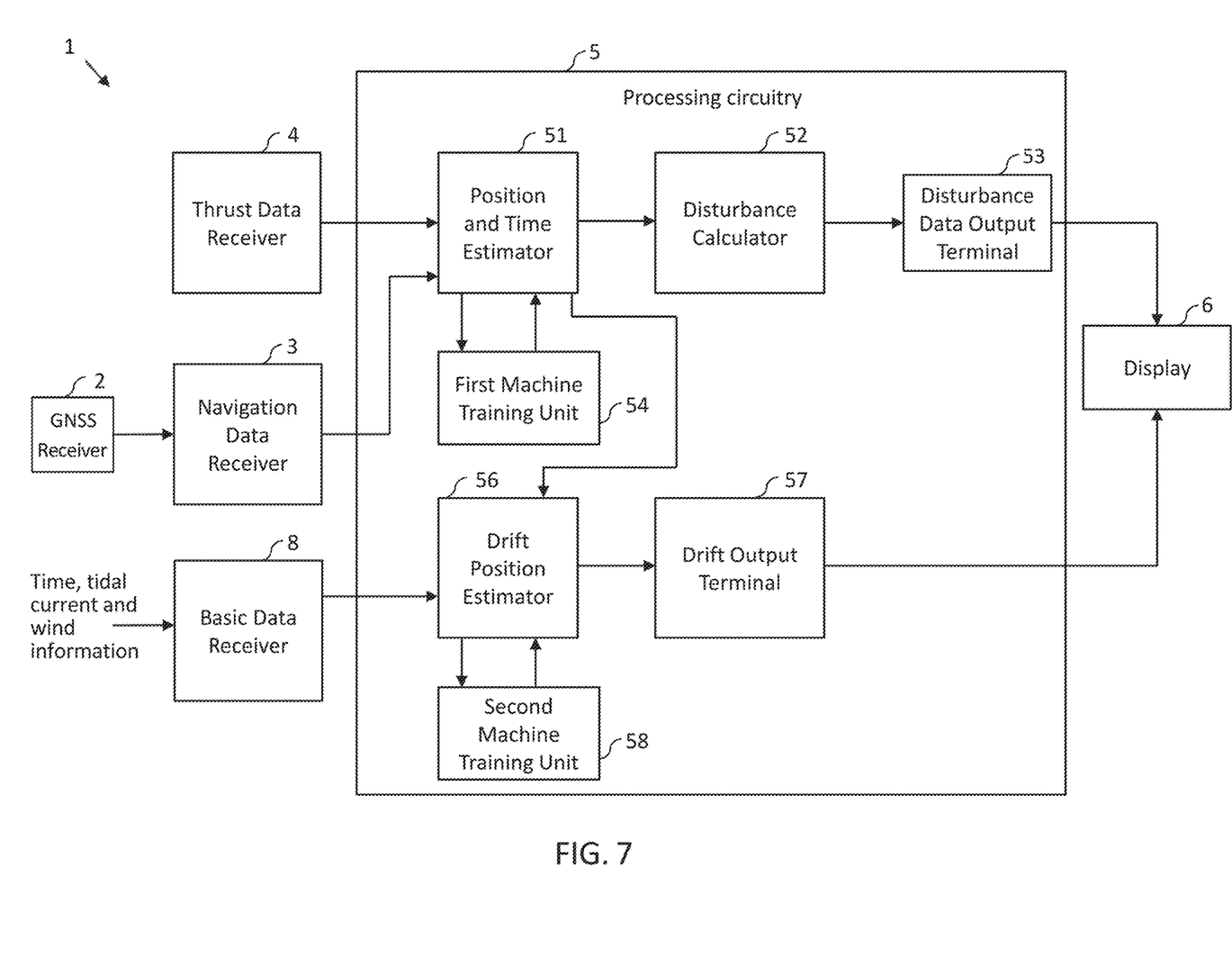
FIG. 7 is a block diagram illustrating a configuration of the disturbance estimation apparatus according to yet another embodiment of the present disclosure.

FIG. 7 is a block diagram illustrating a configuration of the disturbance estimation apparatus 1 for estimating the disturbance acting on the ship 200, according to yet another embodiment of the present disclosure.

The disturbance estimation apparatus 1 further includes a basic data receiver 8, and the processing circuitry 5 further includes a drift position estimator 56, a drift output terminal 57, and a second machine training unit 58. The basic data receiver 8 acquires basic data including a time, the tidal current information and the wind information at a specific time. The drift position estimator 56 estimates a predicted drifting position considering that the ship 200 drifts by the disturbance during navigation, by inputting the basic data, the predicted position, and the predicted arrival time into a second trained model. The second machine training unit 58 including the second trained model outputs the predicted drifting position.

Figure 8:
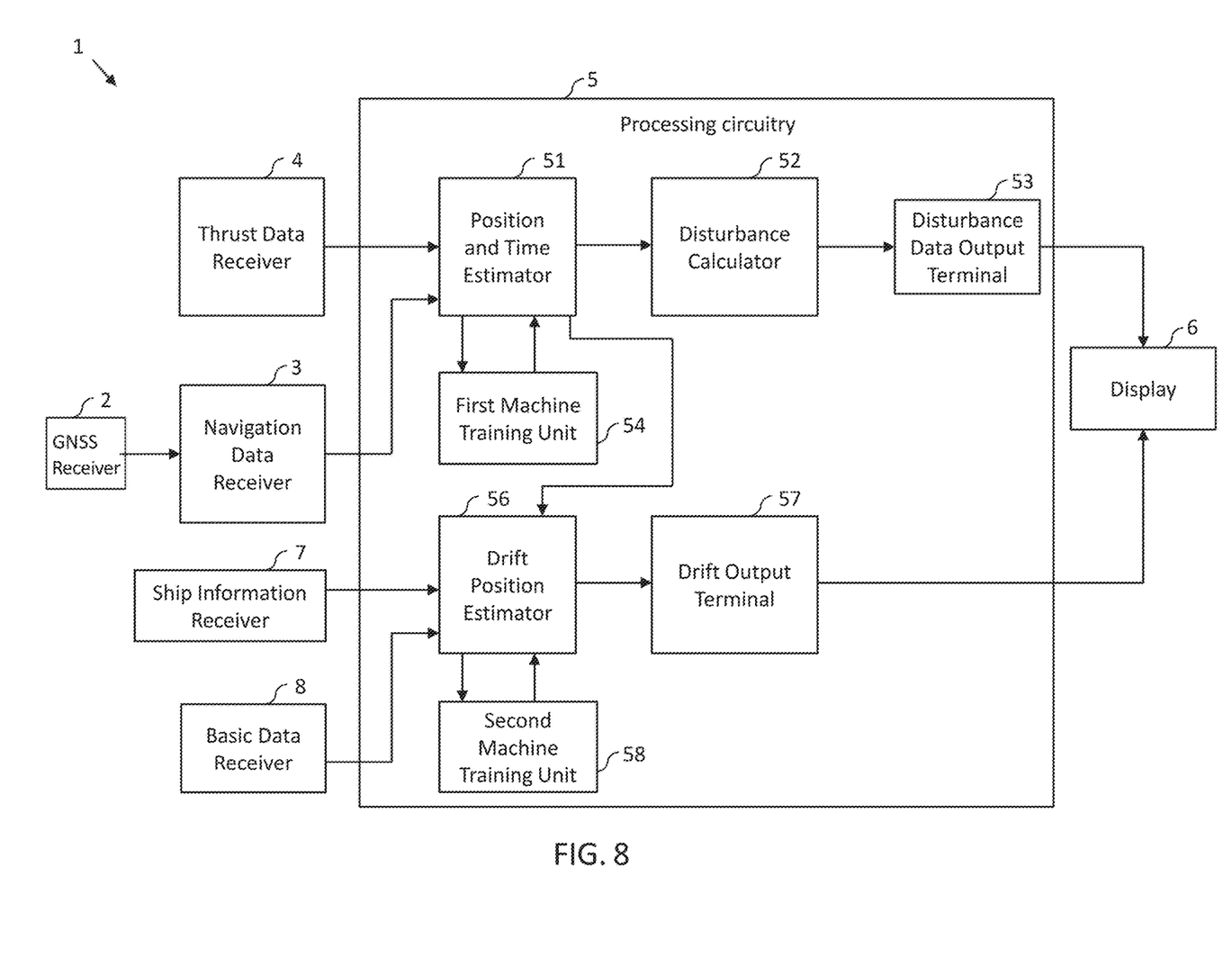
FIG. 8 is a block diagram illustrating a configuration of the disturbance estimation apparatus according to yet another embodiment of the present disclosure.

FIG. 8 is a block diagram illustrating a configuration of the disturbance estimation apparatus 1 for estimating the disturbance acting on the ship 200, according to yet another embodiment of the present disclosure.

The disturbance estimation apparatus 1 further includes the ship information receiver 7 and the basic data receiver 8, and the processing circuitry 5 further includes the drift position estimator 56, the drift output terminal 57, and the second machine training unit 58. The basic data receiver 8 acquires basic data including the time, the tidal current information and the wind information at the specific time. The drift position estimator 56 estimates the predicted drifting position considering that the ship 200 drifts by the disturbance during navigation, by inputting the basic data, the predicted position, and the predicted arrival time into the second trained model. The second machine training unit 58 including the second trained model outputs the predicted drifting position.

Further, the ship information receiver 7 acquires the ship information including the size, the weight, the draft, or the shape of the ship 200. The drift position estimator 56 inputs the ship information into the second trained model such that the second trained model outputs the predicted position and the predicted arrival time according to the ship information.

In one embodiment, the disturbance estimating apparatus 1 further includes a motor or propeller or gear (not shown) including a motor rotational speed sensor or a propeller rotational speed sensor or a gear sensor (not shown), respectively, and a rotational speed sensor (not shown). The motor or propeller or gear is associated with driving of the ship 200 having a configuration for measuring the generated propulsion force (thrust force) as the motor or propeller or gear rotational speed sensor. The disturbance estimation apparatus 1 further includes a rudder (not shown) including a rudder sensor (not shown). The rudder is also associated with driving of the ship 200 having a configuration for measuring a rudder angle (hereinafter also referred to as a "thrust direction") as the rudder sensor. The measured thrust force and the thrust direction are provided to the rotational speed sensor and the rudder sensor to generate the thrust data. The thrust data corresponds to a rotational speed of the motor or propeller or gear and the rudder angle. The rotational speed is measured by the sensor attached to the motor or propeller or gear. The rudder angle is measured by the rudder sensor. The rotational speed sensor and the rudder sensor provide the thrust data to the thrust data receiver 4. Examples of the communication mode utilized by the sensors and other elements, include but are not limited to, serial communication (NMEA 0183), Ethernet, CAN (NMEA 2000), based on the environment of the ship 200.

Figure 9:
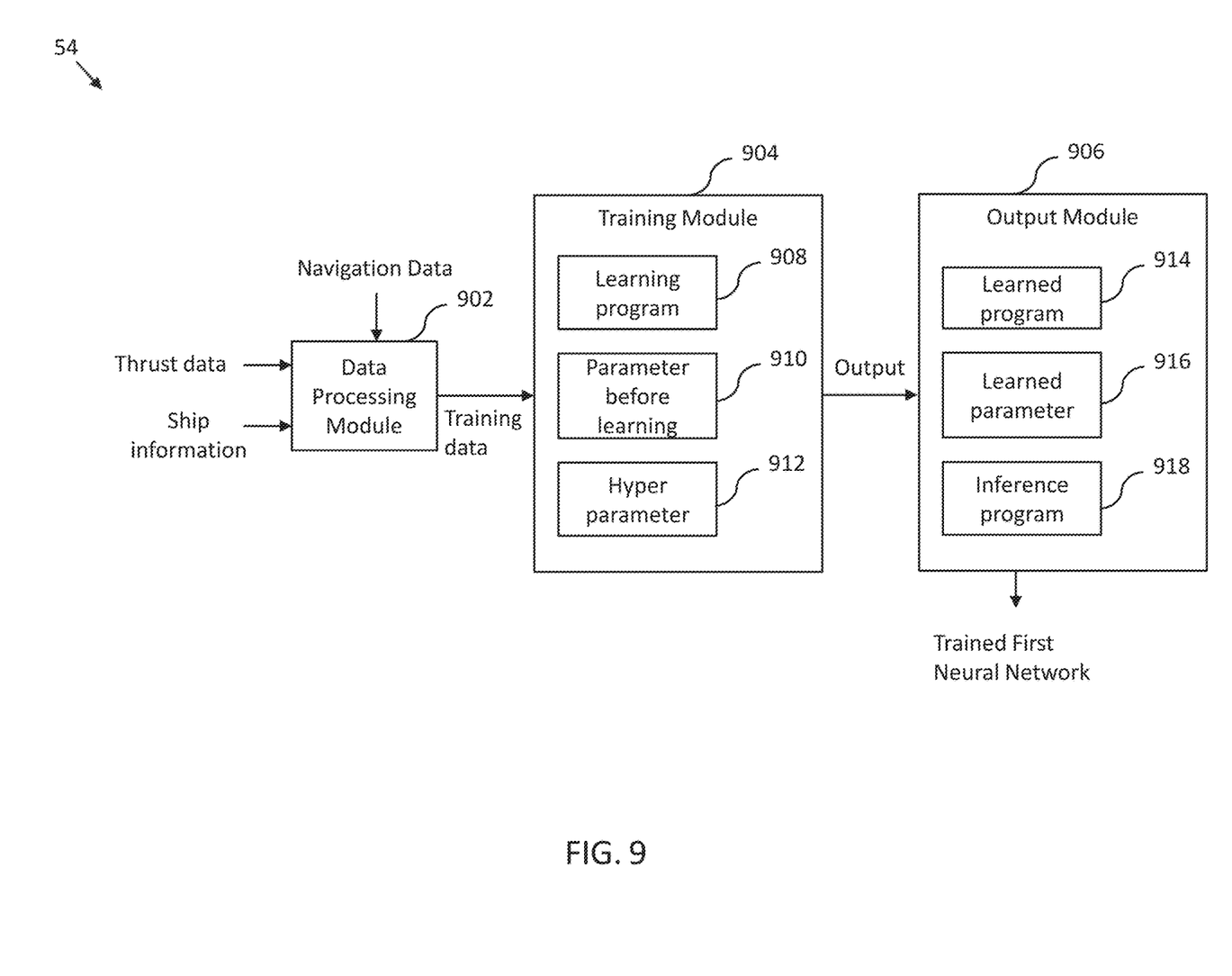
FIG. 9 is a block diagram illustrating a configuration of a first machine training unit according to one embodiment of the present disclosure.

FIG. 9 is a block diagram illustrating a configuration of the first machine training unit 54, according to one embodiment of the present disclosure. The first machine training unit 54 includes a data processing module 902, a training module 904, and an output module 906. During the learning process, the data processing module 902 receives the thrust data, the ship information, and the navigation data as the input data, and processes the input data to generate the training data.

Further, the training module 904 stores a learning program 908, a parameter before learning 910, and a hyper parameter 912. The training module 904 receives the training data from the data processing module 902, and trains a first neural network to learn the predicted position and the predicted arrival time using the thrust data, the navigation data, and the ship information as the training data, the learning program 908, and the hyper parameter 912. The training data may contain the ship information. The hyper parameter 912 is a parameter whose value is used to control the training of the first neural network. The output module 906 received the output of the training module 904, and stores a learned program 914 and a learned parameter 916 based on the output of the training module 904. The output module 906 provides the trained first neural network to the position and time estimator 51 based on the learned program 914, the learned parameter 916, and an inference program 918 stored in the output module 906.

After the learning process, the trained first neural network receives the input data as a reference. The position and time estimator 51 determines the predicted position P2' of the ship 200 at a future point in time and the predicted arrival time T2 of the ship 200. The first neural network training involves the use of an error function. Weights are adjusted such as to minimize a sum of average of the error function on the training data. The process of adjusting the weights is commonly referred to as training. A penalty term is generally applied to the error to restrict the weights in some manner that is thought desirable. The penalty term is used to penalize the magnitudes of weights. In this manner, the first neural network is trained and provides more accurate output with each repetition of a task, such as the generation of the disturbance data. Based on the disturbance data, the ship 200 navigates safely.

It will be apparent to a person skilled in the art that the second machine training unit 58 is structurally and functionally similar to the first machine learning unit 54.

Figure 10A:
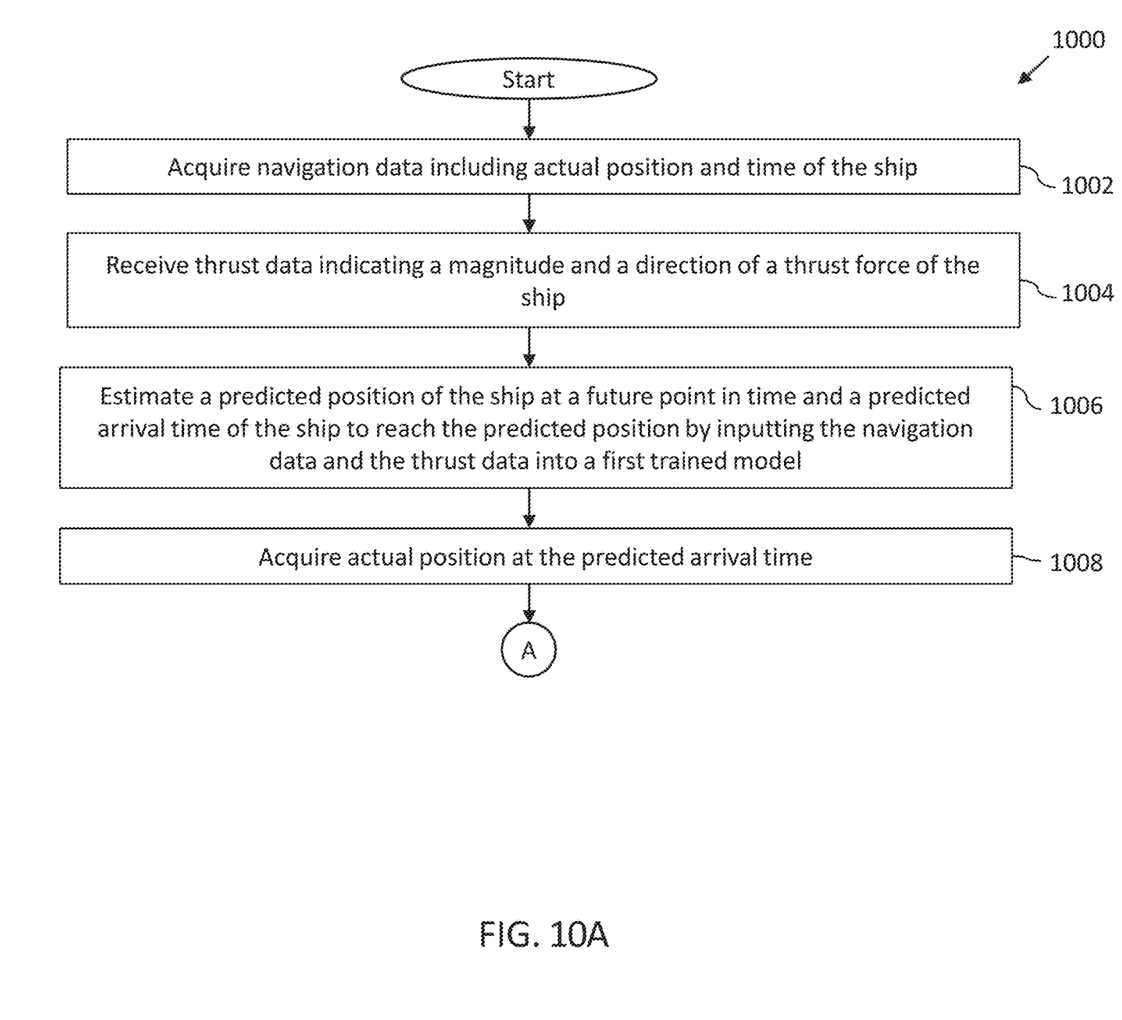
FIGS. 10A and 10B, collectively, represent a flow chart illustrating a disturbance estimation method in accordance with an embodiment of the present disclosure.
Figure 10B:
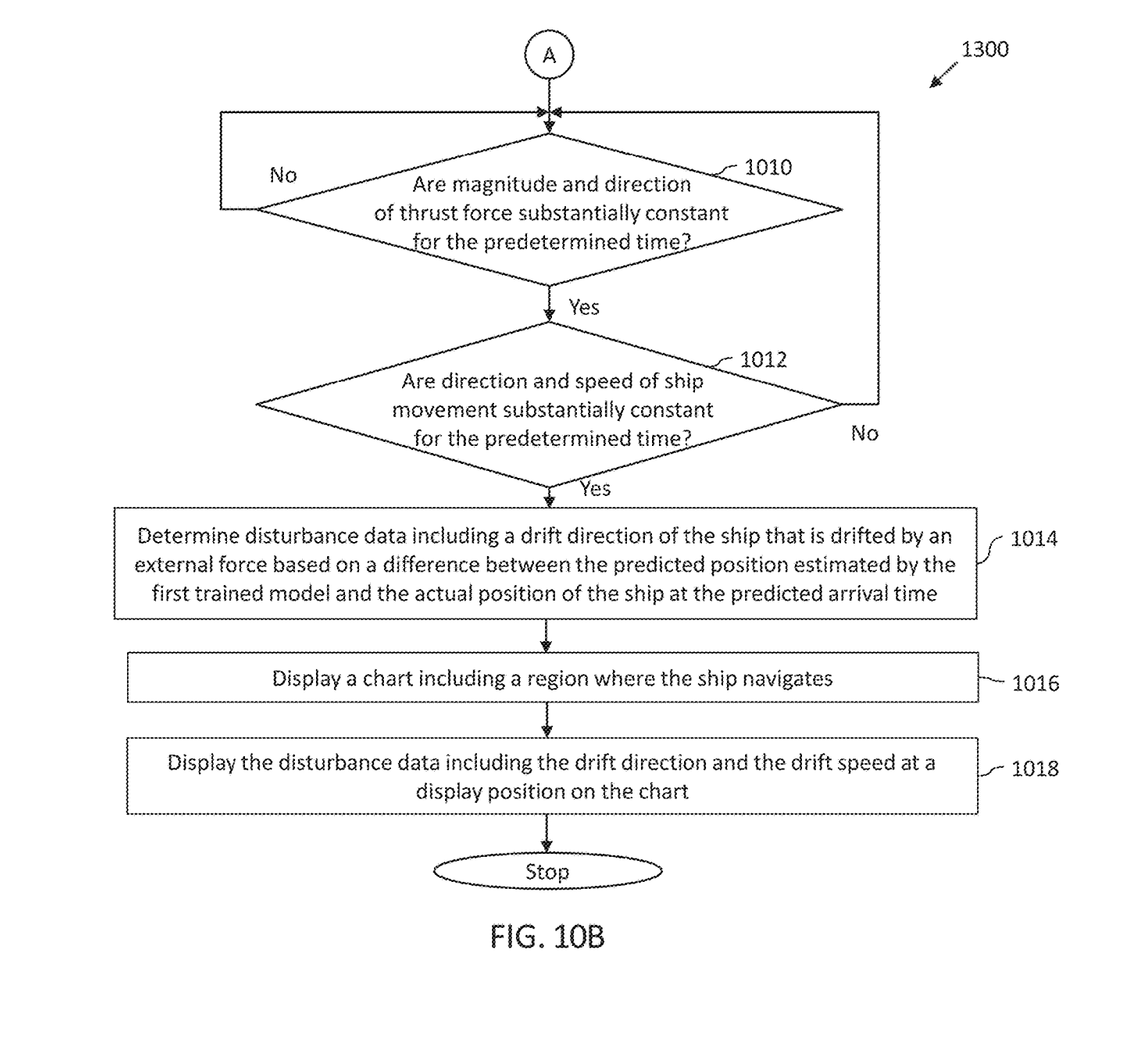

FIGS. 10A and 10B, collectively, represent a flow chart illustrating a disturbance estimation method 1000 in accordance with an embodiment of the present disclosure.

At step 1002, the navigation data receiver 3 acquires the navigation data including the actual position and time of the ship 200. At step 1004, the thrust data receiver 4 receives the thrust data indicating the magnitude and the direction of the thrust force of the ship 200. At step 1006, the processing circuitry 5 estimates the predicted position P2' of the ship 200 at a future point in time and the predicted arrival time T2 of the ship 200 to reach the predicted position P2' by inputting the navigation data and the thrust data into the first trained model.

At step 1008, the processing circuitry 5 acquires the actual position P2 at the predicted arrival time T2. At step 1010, the processing circuitry 5 determines whether each of magnitude and direction of thrust force is at substantially constant for the predetermined time. If at step 1010, the processing circuitry 5 determines that each of the magnitude and direction of thrust force is not at substantially constant for the predetermined time, step 1010 is executed again. If at step 1010, the processing circuitry 5 determines that each of the magnitude and direction of thrust force is at substantially constant for the predetermined time, step 1012 is executed. Wherein, "constant" means that each of a value of the magnitude and direction of thrust force remains greater than the predetermined lower limit and less than the predetermined upper limit. The processing circuitry may determine that each of magnitude and direction of thrust force is substantially constant for the predetermined period of time based on sensor information, or the determination may be made externally and input externally to the processing circuitry.

At step 1012, the processing circuitry 5 determines whether direction and speed ship movement are at substantially constant for the predetermined time. If at step 1012, the processing circuitry 5 determines that each of the direction and speed ship movement is not at substantially constant for the predetermined time, step 1010 is executed again. If at step 1012, the processing circuitry 5 determines that each of the direction and speed ship movement are at substantially constant for the predetermined time, step 1014 is executed. Wherein, "constant" means that each of a value of direction and speed of the ship movement remains greater than a predetermined lower limit and less than a predetermined upper limit. The processing circuitry 5 may determine that each of direction and speed of the ship movement is substantially constant for the predetermined period of time based on the sensor information, or the determination may be made externally and input externally to the processing circuitry 5.

At step 1014, the processing circuitry 5 determines the disturbance data including the drift direction of the ship 200 drifted by an external force based on a difference between the predicted position P2' estimated by the first trained model and the actual position P2 of the ship 200 at the predicted arrival time T2.

At step 1016, the display 6 displays a chart including a region where the ship 200 navigates. At 1018, the display 6 displays the disturbance data including the drift direction and the drift speed at a display position on the chart.

It is to be understood that not necessarily all objectives or advantages may be achieved in accordance with any particular embodiment described Herein. Thus, for example, those skilled in the art will appreciate that certain embodiments may be configured to operate in a manner that achieves or optimizes one advantage or group of advantages as taught herein without necessarily achieving other objects or advantages as may be taught or suggested herein.

All processes described herein may be embodied in, and fully automated via, software code modules executed by a computing system that includes one or more computers or processors. The software code modules may be stored in any type of non-transitory computer-readable medium or other computer storage device. Some or all methods may be embodied in specialized computer hardware.

Many other variations other than those described herein will be apparent from this disclosure. For example, depending on the embodiment, certain actions, events, or functions of any of the algorithms described herein may be performed in different sequences, and may be added, merged, or excluded altogether (e.g., not all described actions or events are required to execute the algorithm). Moreover, in certain embodiments, operations or events are performed in parallel, for example, through multithreading, interrupt handling, or through multiple processors or processor cores, or on other parallel architectures, rather than sequentially. In addition, different tasks or processes can be performed by different machines and/or computing systems that can work together.

The various exemplary logical blocks and modules described in connection with the embodiments disclosed herein can be implemented or executed by a machine such as a processor. The processor may be a microprocessor, but alternatively, the processor may be a controller, a microcontroller, or a state machine, or a combination thereof. The processor can include an electrical circuit configured to process computer executable instructions. In another embodiment, the processor includes an application specific integrated circuit (ASIC), a field programmable gate array (FPGA), or other programmable device that performs logical operations without processing computer executable instructions. The processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, the processor may also include primarily analog components. For example, some or all of the signal processing algorithms described herein may be implemented by analog circuitry or mixed analog and digital circuitry. A computing environment may include any type of computer system, including, but not limited to, a computer system that is based on a microprocessor, mainframe computer, a digital signal processor, a portable computing device, a device controller, or a computing engine within the device.

Unless otherwise stated, conditional languages such as "can," "could," "will," "might," or "may" are understood within the context as used in general to convey that certain embodiments include, while other embodiments do not include, certain features, elements and/or steps. Thus, such conditional languages are not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive languages, such as the phrase "at least one of X, Y, or Z," unless specifically stated otherwise, is understood with the context as used in general to present that an item, term, etc., may be either X, Y, or Z, or any combination thereof (e.g., X, Y, and/or Z). Thus, such a disjunctive language is not generally intended to, and should not, imply that certain embodiments require at least one of X, at least one of Y, or at least one of Z to each be present.

Any process descriptions, elements, or blocks in the flow diagrams described herein and/or shown in the accompanying drawings should be understood as potentially representing modules, segments, or parts of code, including one or more executable instructions for implementing a particular logical function or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under" are defined with respect to the horizontal plane.

As used herein, the terms "attached," "connected," "coupled," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A disturbance estimation apparatus, comprising:
a navigation data receiver configured to acquire navigation data including actual position and time of a ship on a water surface;
a thrust data receiver configured to receive thrust data indicating a magnitude and a direction of a thrust force of the ship;
a ship information receiver configured to acquire ship information including a size, a weight, a draft, or a shape of the ship; and
processing circuitry configured to:
estimate a predicted position of the ship at a future point in time and a predicted arrival time of the ship to reach the predicted position by inputting the navigation data and the thrust data into a first trained model which outputs the predicted position at the future point in time and the predicted arrival time of the ship;
determine disturbance data including a drift direction of the ship drifted by an external force based on a difference between the predicted position estimated by the first trained model and the actual position of the ship at the predicted arrival time; and
input the ship information into the first trained model such that the first trained model outputs the predicted position and the predicted arrival time according to the ship information.

2. The disturbance estimation apparatus of claim 1, further comprising:
a display configured to display:
a chart including a region where the ship navigates; and
the disturbance data including the drift direction at a display position on the chart, wherein the display position corresponds to a location at which the disturbance data is determined.

3. The disturbance estimation apparatus of claim 2, wherein the disturbance data further includes a drift speed of the ship drifted by the external force, and wherein the processing circuitry further configured to:
determine the drift speed, based on dividing a distance between the predicted position and the actual position by a time required to reach to the actual position.

4. The disturbance estimation apparatus of claim 1, wherein the disturbance data further includes a drift speed of the ship drifted by the external force, and wherein the processing circuitry further configured to:
determine the drift speed, based on dividing a distance between the predicted position and the actual position by a time required to reach to the actual position.

5. The disturbance estimation apparatus of claim 4, further comprising:
a display configured to display:
a chart including a region where the ship navigates; and
the disturbance data including the drift direction and the drift speed of the disturbance at a display position on the chart, wherein the display position corresponds to a location at which the disturbance data is determined.

6. The disturbance estimation apparatus of claim 1, wherein the processing circuitry is further configured to:
determine the disturbance data when the magnitude and the direction of the thrust force of the ship are at the substantially constant for a predetermined time.

7. The disturbance estimation apparatus of claim 1, wherein the processing circuitry is further configured to:
estimate the disturbance data when each of a direction and a speed of the ship is at the substantially constant for a predetermined time.

8. The disturbance estimation apparatus of claim 1, wherein the processing circuitry is further configured to:
acquire measurement information measured by a tidal current meter and an anemometer;
determine presence or absence of the disturbance based on the measurement information; and train the first trained model using corrected data as training data to output a corrected predicted position estimated by a retrained first trained model based on the actual position arrived at the predicted time when the absence of the disturbance is determined.

9. The disturbance estimation apparatus of claim 1, further comprising:
a basic data receiver configured to acquire basic data including a time, tidal current information and wind information at a specific time, and wherein the processing circuitry is further configured to:
estimate a predicted drifting position considering that the ship drifts by the disturbance during navigation, by inputting the basic data, the predicted position, and the predicted arrival time into a second trained model which outputs the predicted drifting position.

10. The disturbance estimation apparatus of claim 1, further comprising:
a global navigation satellite system (GNSS) receiver configured to receive the actual position of the ship.

11. A disturbance estimation method, comprising:
receiving navigation data including an actual position and time of a ship on a water surface;
receiving thrust data indicating a magnitude and a direction of a thrust force of the ship;
acquiring ship information including a size, a weight, a draft, or a shape of the ship;
estimating a predicted position of the ship at a future point in time and a predicted arrival time of the ship to reach the predicted position by inputting the navigation data and the thrust data into a first trained model which outputs the predicted position at the future point in time and the predicted arrival time of the ship;
determining disturbance data including a drift direction of the ship drifted by an external force based on a difference between the predicted position estimated by the first trained model and the actual position of the ship at the predicted arrival time; and
inputting the ship information into the first trained model such that the first trained model outputs the predicted position and the predicted arrival time according to the ship information.

12. The disturbance estimation method of claim 11, further comprising:
displaying a chart including a region where the ship navigates; and
displaying the disturbance data including the drift direction at a display position on the chart, wherein the display position corresponds to a location at which the disturbance data is determined.

13. A non-transitory computer readable medium having stored thereon computer-executable instructions which, when executed by a computer, cause the computer to:
receive navigation data including an actual position and time of the ship on a water surface;
receive thrust data indicating a magnitude and a direction of a thrust force of the ship;
acquire ship information including a size, a weight, a draft, or a shape of the ship;
estimate a predicted position of the ship at a future point in time and a predicted arrival time of the ship to reach the predicted position by inputting the navigation data and the thrust data into a first trained model which outputs the predicted position at the future point in time and the predicted arrival time of the ship;
determine disturbance data including a drift direction of the ship drifted by an external force based on a difference between the predicted position estimated by the first trained model and the actual position of the ship at the predicted arrival time; and
input the ship information into the first trained model such that the first trained model outputs the predicted position and the predicted arrival time according to the ship information.

* * * * *